United States Patent
Hildebrand et al.

(10) Patent No.: US 6,292,665 B1
(45) Date of Patent: Sep. 18, 2001

(54) GEOLOCATION OF CELLULAR PHONE USING SUPERVISORY AUDIO TONE TRANSMITTED FROM SINGLE BASE STATION

(75) Inventors: Robert C. Hildebrand, Indialantic; Julian Bartow Willingham, Melbourne, both of FL (US); Robert W. Boyd, Eidson, TN (US); David A. Hosang, Bedford, NH (US)

(73) Assignee: Harris Corporation, Melbourne, FL (US)

( * ) Notice: Subject to any disclaimer, the term of this patent is extended or adjusted under 35 U.S.C. 154(b) by 0 days.

(21) Appl. No.: 09/168,534

(22) Filed: Oct. 8, 1998

(51) Int. Cl.$^7$ ...................................................... H04Q 7/22
(52) U.S. Cl. ........................ 455/456; 455/435; 455/562; 342/357.1; 342/357.13
(58) Field of Search ..................................... 455/404, 410, 455/411, 434, 435, 456, 457, 562, 132; 342/357, 368, 450, 457, 458, 357.01, 357.02, 357.1, 357.13

(56) References Cited

U.S. PATENT DOCUMENTS

| | | | |
|---|---|---|---|
| 5,216,429 | 6/1993 | Nakagawa et al. | 342/450 |
| 5,293,642 | * 3/1994 | Lo | 455/456 |
| 5,446,756 | 8/1995 | Mallinckrodt . | |
| 5,600,706 | 2/1997 | Dunn et al. . | |
| 5,612,703 | 3/1997 | Mallinckrodt | 342/457 |
| 5,945,948 | * 8/1999 | Buford et al. | 342/457 |
| 5,952,969 | * 9/1999 | Hagerman et al. | 342/457 |
| 5,960,047 | * 9/1999 | Proctor, Jr. et al. | 455/132 |
| 6,026,305 | * 2/2000 | Salinger et al. | 455/456 |
| 6,031,490 | * 2/2000 | Forssén et al. | 455/456 |

* cited by examiner

Primary Examiner—Lester G. Kincaid
(74) Attorney, Agent, or Firm—Allen, Dyer, Doppelt, Milbrath & Gilchrist, P.A.

(57) ABSTRACT

In order to geolocate a wireless communication device (cellular phone) initiating a 911 call, a base station transceiver transmits a supervisory audio tone (SAT), which is automatically looped back by the calling cellular phone. Returned SAT signals are correlated with those transmitted to determine the range of the cellular phone. In addition, incoming signals from the cellular phone, such as the returned SAT signals, are received by a phased array antenna and subjected to angle of arrival processing to determine the direction of the cellular phone relative to the base station. Given this angle of arrival and range information the cellular phone is geolocated. Since the total travel distance of SAT signals between the base station and the cellular phone traverses a two-way path from the base station to the cellular phone and back, plus a loopback path through the circuitry of the phone, the range R of the cellular phone from the base station is calculated in accordance with the equation $R = C \times m/2 - k$, where C is the velocity of light, m is a correlation time shift interval, and k is a correction factor associated with the loopback path, and varies with manufacturer and phone type. The value of k is provided by the phone manufacturer and is accessed using equipment serial number information conveyed in the incoming control channel call establishment request from the calling phone.

9 Claims, 2 Drawing Sheets

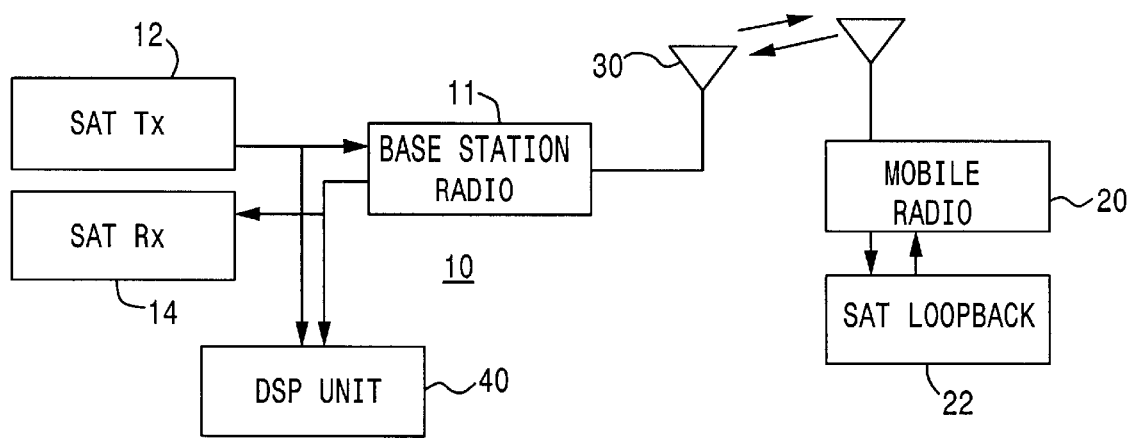
FIG. 1
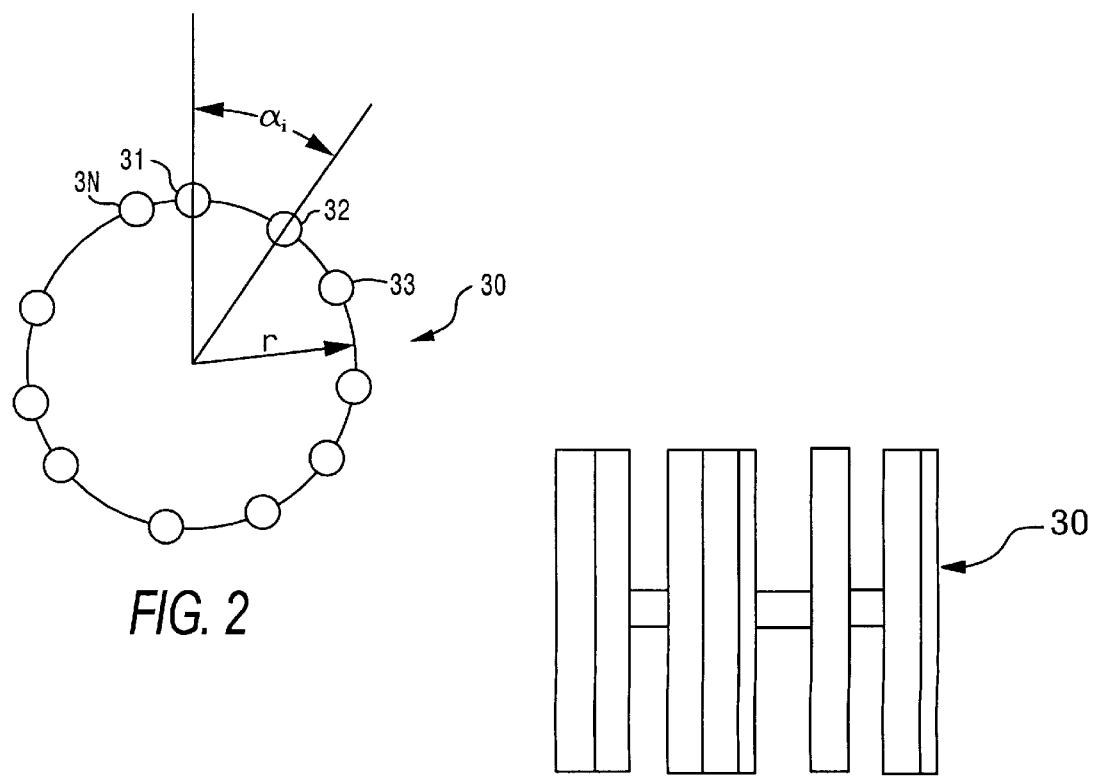
FIG. 2
FIG. 3

GEOLOCATION OF CELLULAR PHONE USING SUPERVISORY AUDIO TONE TRANSMITTED FROM SINGLE BASE STATION

FIELD OF THE INVENTION

The present invention relates in general to wireless (e.g., cellular) communication systems, and is particularly directed to a base station-installed signal processing mechanism, which processes signals received at a phased array antenna to determine the angle of arrival of signals from a wireless communication device, such as a cellular phone, and correlates the base station's transmitted supervisory audio tone (SAT) signal with that returned from the cellular phone, in order to determine range and thereby geolocate the device, as in the case of receipt of an emergency services access ('dial 911') type of call.

BACKGROUND OF THE INVENTION

Whenever a wireline telephone user places an emergency access call, such as by dialing 911, automatic number identification information (ANI) signals embedded in the call are employed by a database search mechanism to automatically provide the location of the calling subscriber circuit to a Public Safety Answering Point (PSAP). However, when a 911 type of call is placed from a wireless communication device, such as a cellular telephone, phone location information cannot be automatically provided to the PSAP, since the calling cellular phone is a mobile rather than a fixed piece of equipment. Because of this shortcoming, the Federal Communications Commission has mandated that steps be taken by the communications industry to make cellular phones geolocation capable to within a prescribed accuracy (one hundred twenty-five meters). In addition to meeting this emergency services requirement, automatically providing geolocation information also facilitates a number of ancillary functions, such as location-based billing, locating a stolen or misplaced phone, fraud reduction, and tracking and location capability for dispatch, delivery and sales personnel.

Current proposals to satisfy the above objectives include relatively complex and costly trilateration schemes that are based upon differences in time or angles of arrival of a timing fix or reference signal transmitted by the cellular phone and received at three or more geographically spaced apart receivers. Other proposals include the use of a phased array antenna and a pair of receiver stations to determine angle of arrival and difference in time of arrival for triangulation purposes. Another proposal is to require that all currently employed cell phones be retrofitted with additional signal processing circuitry, such as that including a global positioning system (GPS) processor-based receiver, through which the cell phone determines its position and then transmits that information as part of the 911 call.

SUMMARY OF THE INVENTION

In accordance with the present invention, rather than have to employ an arrangement of geographically dispersed receiver stations, or modify the internal circuitry of each cellular phone, advantage is taken of the supervisory audio tone (SAT) that is transmitted by a base station and returned from a calling cellular phone in the course of the call establishment process that is conducted via the control channel. In particular, the present invention is directed to a supervisory audio tone (SAT) signal processing mechanism that is readily installed in a respective base station equipped with a phased array antenna.

This SAT signal processing mechanism is operative to correlate the returned SAT signals with those transmitted by the base station to determine the range of the cellular phone. In addition, signals from the cellular phone, such as but not limited to the returned SAT signals, are subjected to an angle of arrival processing mechanism for determining the direction of the cellular phone relative to the base station. Given this angle of arrival and range information the cellular phone is geolocated.

The transceiver of a base station is coupled with a supervisory audio tone (SAT) transmitter, which is operative to generate a supervisory audio tone, and an SAT receiver, which is operative to receive and perform standard processing of the SAT signal returned by a loopback mechanism embedded within the calling cellular subscriber's mobile phone and received by the base station transceiver in the course of setting up the call prior to voice communication signaling.

Radio wave signaling is effected via a phased array antenna. The elements of the antenna are coupled through down-conversion and digitization circuitry to a digital signal processing unit, which subjects signals received by the respective elements of the array to an angle of arrival determination routine, to provide a directional (azimuth) fix on the location of the calling cellular phone relative to the base station.

In order to determine the range of the calling cellular phone relative the base station, each of the SAT signal sourced by the SAT transmitter and the returned SAT signal received by the base station radio is subjected to a correlation processing routine, coupled to the output of a band pass filter tuned to the frequency of the supervisory audio tone. The largest of correlation peak values is selected by a peak detector as that associated with the travel time and therefore line-of-sight distance or range to the cellular phone.

Since the total travel distance of SAT signals between the base station and the cellular phone traverses a two-way path from the base station to the cellular phone and back, plus a loopback path through the circuitry of the phone, the time offset associated with the correlation peak selected by the peak detector is slightly more than twice the actual travel time of radio wave signals between the cellular phone and the base station.

To correct for this offset through the circuitry of the mobile phone, the actual range of the cellular phone from the base station is calculated in accordance with the equation $R=C \times m/2-k$, where C is the velocity of light and k is a correction factor associated with the loopback path through the circuitry of the cellular phone, and varies with manufacturer and phone type. The value of k is provided by the phone manufacturer and is stored in a database; it is accessed using equipment serial number information conveyed in the incoming control channel call establishment request from the calling phone.

BRIEF DESCRIPTION OF THE DRAWINGS

FIG. 1 diagrammatically illustrates a mobile cellular phone and a cellular base station containing the SAT signaling based azimuth and range signal processing mechanism of the present invention for geolocating the cellular phone;

FIG. 2 is a diagrammatic plan view of a phased array antenna of the type described in co-pending U.S. Pat. application Ser. No. 09/081,476;

FIG. 3 is a diagrammatic side view of a phased array antenna of the type described in co-pending U.S. Pat. application Ser. No. 09/081,476.

DETAILED DESCRIPTION

Figure 4:
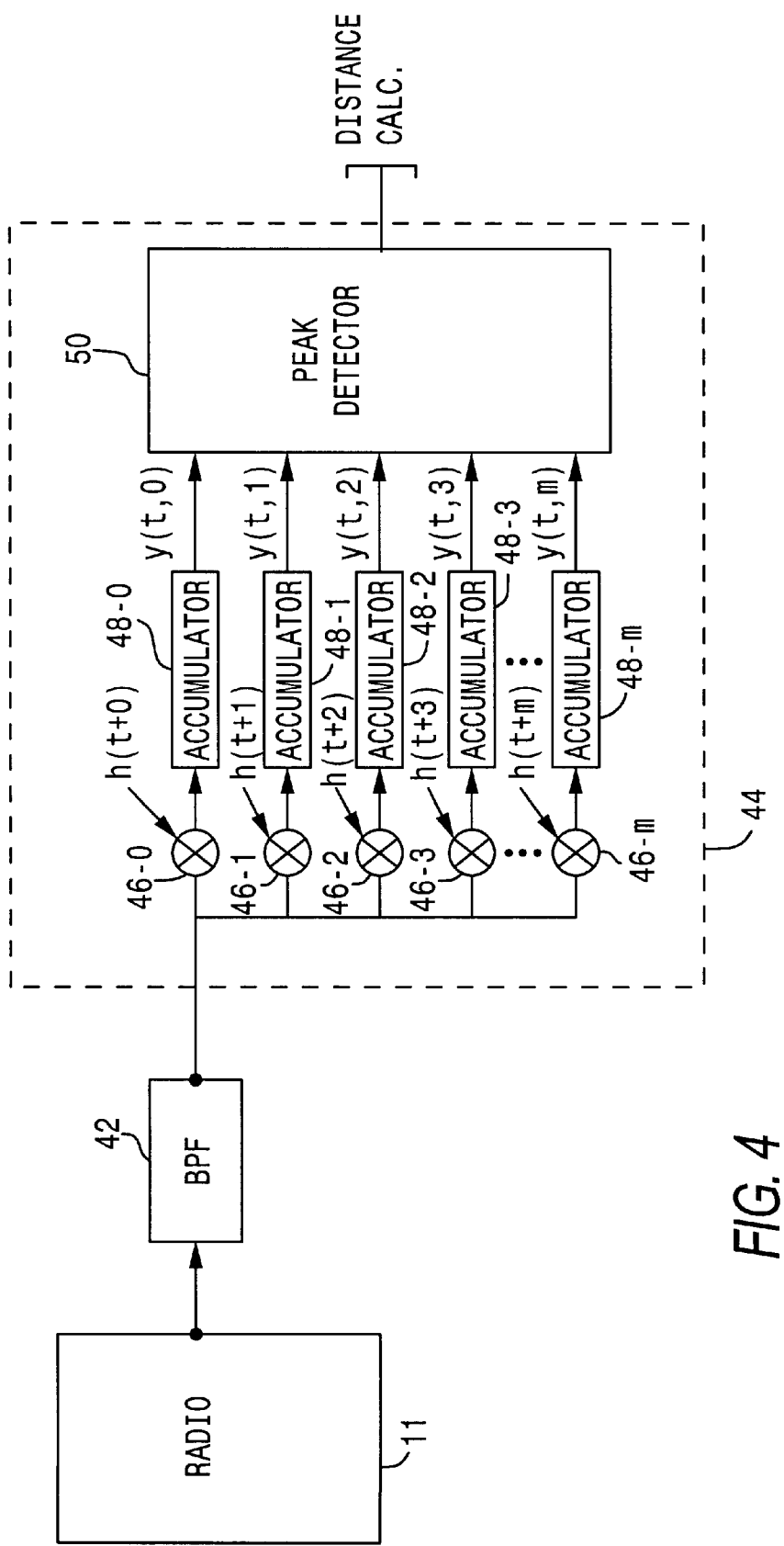
FIG. 4 diagrammatically illustrates an SAT signal correlation routine for determining the range of a calling cellular phone relative the base station.

Before describing in detail the new and improved cellular phone geolocation scheme in accordance with the present invention, it should be observed that the invention resides primarily in what is effectively a prescribed arrangement of conventional communication circuits and associated signal processing components and attendant supervisory control circuitry therefor, that controls the operations of such circuits and components. Consequently, the configuration of such circuits and components, and the manner in which they are interfaced with other communication system equipment have, for the most part, been illustrated in the drawings by readily understandable block diagrams. These diagrams show only those specific details that are pertinent to the present invention, so as not to obscure the disclosure with details which will be readily apparent to those skilled in the art having the benefit of the description herein. Thus, the block diagram illustrations are primarily intended to show the major components of the system in a convenient functional grouping, whereby the present invention may be more readily understood.

As pointed out briefly above, the geolocation mechanism of the present invention performs angle of arrival processing of signals received by a base station phased array antenna and correlation processing of SAT signals from a cellular phone of interest to respectively determine the azimuth (AZ) and range (R) of that cellular phone relative to the base station. Since the base station is fixed, the geographical coordinates of the cell phone are readily determined in the same manner as a wireline phone, as described above.

For this purpose, as diagrammatically illustrated in FIG. 1, coupled with the radio (transceiver) 11 of a base station 10 is a supervisory audio tone (SAT) transmitter 12 and a supervisory audio tone receiver 14. The SAT transmitter 12 is operative to generate a prescribed supervisory audio tone, such as one selected from the set of three sine wave tones: 5970 Hz, 6000 Hz and 6030 Hz, currently employed by commercial cellular communication systems. The base station radio's SAT receiver 14 is operative to receive and perform standard processing of the SAT signal returned by a loopback mechanism 22 embedded within the calling cellular subscriber's mobile phone 20 and received by the base station radio 11 in the course of setting up the call prior to voice communication.

Radio wave signaling is effected via a phased array antenna 30 to which the base station's transceiver 11 is coupled. As a non-limiting example, and in accordance with a preferred embodiment of the present invention, the phased array antenna 30 is of the type described in co-pending U.S. Pat. application, Ser. No. 09/081,476 (hereinafter referred to as the '476 application), filed May 19, 1998, by R. Hildebrand et al, entitled "Circular Phased Array Antenna Having Non-Uniform Angular Separations Between Successively Adjacent Elements,", assigned to the assignee of the present application and the disclosure of which is incorporated herein.

As diagrammatically illustrated in the plan view of FIG. 2 and the side view of FIG. 3, phased array antenna 30 contains a plurality of N antenna (dipole) elements 31, 32, 33, ..., 3N, that are unequally distributed in a two-dimensional array, shown as a generally non-linear array, such as a circular array. The dipoles of the antenna array are oriented to form a directivity pattern that is generally parallel to the plane of the array. Preferably, the diameter of the antenna array is at least an order of magnitude greater than the wavelength of the carrier center frequency of interest.

The unequal angular spacing between successively adjacent antenna elements $3_i$ and $3_{i+1}$ of the array is defined so as to decorrelate separations thereamong, such that for any radial line 'r' intersecting an element of the array 30, the vector distance from any point along that radial direction to any two antenna elements of the array is unequal and uniformly distributed in phase (modulo $2\pi$). To implement this decorrelating vector distance criterion, the angular separation between any two successively adjacent antenna elements $3_i$ and $3_{i+1}$, as one proceeds around the array 30, may vary in accordance with an Nth root of two, wherein N is the total number N of antenna elements in the array. The angular separation between successive ones of the N elements of the antenna array is such that, for one element located at any arbitrary location along the array, the angular spacing $\alpha_1$ of a second element relative to the first element is defined by $\alpha_1 = 2\pi * (2^{1/N} - 1)$. The angular spacing $\alpha_j$ of each additional element relative to the first element is defined by $\alpha_j = \alpha_{j-1} * 2^{1/n}$, where j varies from 2 to N.

Each of the respective elements $3i$ of the base station's phased array antenna 30 is coupled through down-conversion and digitization circuitry to a digital signal processing (DSP) unit 40. In accordance with the invention, DSP unit 40 is operative to subject signals received by the respective elements of the array to an angle of arrival determination routine, such as, but not limited to, the well known 'MUSIC' or 'ESPRIT' angle of arrival steering vector-based algorithms. Such angle of arrival processing may be conducted on any signals received from said cellular phone, such as but not limited to initial call establishment request signals or returned SAT signals, to provide a directional (azimuth) fix on the location of the calling cellular phone 20 relative to the base station 10.

In order to determine the range of the calling cellular phone 20 (relative the base station 10), each of the SAT signal sourced by the SAT transmitter 12 and the returned SAT signal received by the base station radio 11 is subjected to a correlation processing routine executed within the DSP unit 40.

As shown in FIG. 4, this correlation routine includes a band pass filter 42, that is selectively tuned to the frequency of the supervisory audio tone (i.e. that one of the above-referenced set of three sine wave tones: 5970 Hz, 6000 Hz and 6030 Hz). The output of the bandpass filter 42 is coupled to a time shift extractor 44, comprised of multiplier/accumulator pairs 46-0/48-0, ..., 46-m/48-m, and a peak detector 50 to which the outputs of the accumulators 48-0, ..., 48-m are coupled. The value of m determines the precision with which respective correlation peaks are determined. The smaller the value of m, the narrower the portion of the SAT sine wave tone employed to perform the range-finding correlation operation.

Each respective multiplier 46-i is operative to multiply the mobile phone-returned SAT signal x(t) received by the base station transceiver 11 and filtered by band pass filter 42 by a time shifted version h(t+i) of the SAT signal generated by the SAT transmitter 12. The resultant products at the outputs of the multipliers 46 are accumulated as summation or correlation peak values y(t,0), ..., y(t,m) in respective accumulators 48. The largest of these correlation peak values is selected by a peak detector 50 to identify which correlation peak is associated with the shortest travel time and therefore line-of-sight distance to the cellular phone 20.

The time offset associated with the selected correlation peak represents the transmission travel time of the SAT signal from its generation by the SAT transmitter 12 to its receipt by base station transceiver 11. Since this total travel distance traverses a two-way path from the base station 10 to the cellular phone 20 and back, plus a loopback path through the circuitry of the phone 20, the time offset associated with the correlation peak selected by peak detector 50 is slightly more than twice the actual travel time of radio wave signals between the cellular phone and the base station.

To correct for this offset (through the circuitry of the mobile phone), the actual range R of the cellular phone 20 from the base station 10 is calculated in accordance with the equation $R=C\times m/2-k$, where C is the velocity of light and k is a correction factor associated with the loopback path through the circuitry of the cellular phone, and varies with manufacturer and phone type. The value of k is provided by the phone manufacturer and is stored in a database; it is accessed in accordance with the phone identification (equipment serial number) information conveyed in the incoming control channel call establishment request from the calling phone.

To reduce the effects of noise on the accuracy of correlation-based range determination described above, the correlation processing described above is preferably conducted over a reasonably large number of SAT signal periods. Similarly, to effectively compensate for multipath, the 'earliest' (in time) correlation peak (i.e., that associated with the shortest travel time) is selected. With cell phone range having been determined, both the azimuth (direction) and range of the calling phone relative to the base station (whose geographical location is fixed), the geographical coordinates of the calling cell phone are readily identified, so that emergency management services may be provided in the same manner as a response to a 911 call placed from a wireline telephone.

While we have shown and described an embodiment in accordance with the present invention, it is to be understood that the same is not limited thereto but is susceptible to numerous changes and modifications as known to a person skilled in the art, and we therefore do not wish to be limited to the details shown and described herein, but intend to cover all such changes and modifications as are obvious to one of ordinary skill in the art.

What is claimed:

1. A method of geolocating a wireless communication device comprising the steps of:
   (a) transmitting a supervisory audio tone (SAT) signal from a base station;
   (b) receiving said SAT signal returned from said wireless communication device;
   (c) subjecting said SAT signal transmitted in step (a) and said SAT signal received in step (b) to a range processing operation so as to determine the range of said wireless communication device from said base station wherein said range processing operation is operative to compensate for signal travel time over a loopback path through said wireless communication device using a correlation factor stored in a database and accessed with identification information received from the wireless communication device;
   (d) subjecting signals received by said base station from said wireless communication device to a direction processing operation so as to determine the direction of said wireless communication device relative to said base station and;
   (e) identifying the location of said wireless communication device in accordance with said range and direction.

2. A method according to claim 1, wherein step (d) comprises subjecting returned SAT signals received by said base station from said wireless communication device to said direction processing operation to determine the direction of said wireless communication device relative to said base station.

3. A method according to claim 1, wherein step (c) includes correlating said SAT signal transmitted in step (a) with said SAT signal received in step (b).

4. A method according to claim 1, wherein step (d) comprises subjecting signals received by said base station from said wireless communication device other than returned SAT signals to said direction processing operation to determine the direction of said wireless communication device relative to said base station.

5. A method according to claim 1, wherein step (d) comprises subjecting signals received by a base station phased array antenna from said wireless communication device to said direction processing operation to determine the direction of said wireless communication device relative to said base station.

6. A method according to claim 1, wherein step (c) comprises determining range (R) from said base station to said wireless communication device in accordance with the relationship equation $R=C\times m/2-k$, where C is the velocity of light, m is a correlation time shift interval, and k is a correction factor associated with said loopback path through said wireless communication device.

7. A method according to claim 1, wherein said wireless communication device comprises a cellular phone.

8. A method of geolocating a wireless communication device relative to a base station comprising the steps of:
   (a) monitoring wireless communication request activity via a phased array antenna at said base station;
   (b) in response to receiving an incoming call establishment request from said wireless communication device, transmitting a supervisory audio tone (SAT) signal from said base station to said wireless communication device and conducting a direction processing operation so as to determine the direction of said wireless communication device relative to said base station based on returned signals only from the wireless communication device;
   (c) processing said SAT signal transmitted from said base station in step (b) and SAT signals returned from only said wireless communication device in accordance with a range determination operation so as to establish the range between said wireless communication device and said base station; and
   (d) identifying the location of said wireless communication device in accordance with said range and direction; and wherein
   step (c) includes correlating said SAT signal transmitted in step (b) with SAT signals received from said wireless communication device,
   said range processing operation is operative to compensate for signal travel time over a loopback path through said wireless communication device,
   step (b) comprises determining range (R) from said base station to said wireless communication device in accordance with the relationship equation $R=C\times$ $m/2-k$, where C is the velocity of light, m is a correlation time shift interval, and k is a correction factor associated with said loopback path through said wireless communication device, and said correction factor is stored in a database and is accessible in accordance with identification information transmitted to said base station from said wireless communication device.

9. An arrangement for geolocating a wireless communication device comprising:

a base station transceiver which is operative to transmit a supervisory audio tone (SAT) signal to said wireless communication device and to receive said SAT signal as returned from said wireless communication device over a phased array antenna at the base station; and a signal processing unit, which is coupled to said base station transceiver and is operative to subject returned signals received only from said wireless communication device to a direction processing operation so as to determine the direction of said wireless communication device relative to said base station, and to subject said transmitted SAT signal transmitted and said returned SAT signal to a range processing operation to determine the range of said wireless communication device from said base station, so that the location of said wireless communication device may be established in accordance with said range and direction; and wherein said signal processing unit is operative to compensate for signal travel time over a loopback path through said wireless communication device, said signal processing unit is operative to determine range (R) from said base station to said wireless communication device in accordance with the relationship equation $R=C \times m/2-k$, where C is the velocity of light, m is a correlation time shift interval, and k is a correction factor associated with said loopback path through said wireless communication device, and said correction factor is stored in a database and is accessible in accordance with identification information transmitted to said base station from said wireless communication device.

* * * * *